Patented Nov. 30, 1943

2,335,452

UNITED STATES PATENT OFFICE 2,335,452

INHIBITOR FOR ACID PICKLING BATHS AND PROCESS OF MAKING

Franz Schelling, Dornholzhausen in Taunus, Germany; vested in the Alien Property Custodian No Drawing. Application August 13, 1940, Serial No. 352,465. In Germany June 10, 1939

3 Claims. (Cl. 252—149)

My invention relates to the pickling of metals or metallic articles, particularly those made from iron or steel, with acids such as sulphuric acid or hydrochloric acid. A further object of my invention is the addition of substances suitable to inhibit the attack of the acids on the metal to be pickled. These are the so-called "inhibitors" as, for instance, ammonium thiocyanate, which is known to the art.

Now I have found that the attack of the acids on the metals may be stopped in a particularly effective manner if the inhibitors contain condensation products of aldehydes and/or ketones and other condensable substances besides the above mentioned ammonium thiocyanate.

As condensation products according to my invention I mean the well known compounds obtained by condensation of amines or their derivatives such as urea, thiourea, cyanamide, dicyandiamide or phenols and their derivatives with aldehydes, ketones and/or polymerisation products thereof. Condensation products of artificial resin character have proved to be especially suitable.

The ammonium thiocyanate used in combination with the condensation products serves as carrier. Thiourea, however, serves not only as carrier for the artificial resin but is also one of the components of the artificial resin itself.

Especially good results were obtained by the use of products which were formed in the heat through the action of aldehydes and ketones on complex compounds of ammonium thiocyanate or thiourea or mixtures therefrom with aniline.

According to my invention mixtures of ammonium thiocyanate and thiourea may be produced by mechanical mixing of the components, preferably in equal parts or by heating of ammonium thiocyanate to temperatures of 150-230° C.

Excellent results will be obtained if the process is carried out on the basis of ammonium thiocyanate or thiourea or their mixtures. I prefer to work in such manner that the condensation products are manufactured in such small quantities that they form a thin layer on the surface of the crystals of ammonium thiocyanate or thiourea.

The inhibitors made from artificial resins sometimes show the disadvantage that they agglomerate on account of their slow solubility, especially during the hot pickling on the beginning of the pickling whereby the sheets may adhere together. According to my invention this disadvantage may be prevented by adding porous substances to the inhibitors, such as wood dust, potato flour, talcum or the like, either during the operative process or thereafter. These additions produce a uniform distribution of the inhibitors in the pickling bath and cause a higher degree of efficiency.

The quantities of inhibitors to be added may vary in wide ranges. In general, additional quantities of 0.01% are sufficient to warrant an efficient protection of the metals against the pickling acids.

If desired, suitable wetting, emulsifying or froth agents may be added to the inhibitors made from artificial resins.

Example 1

A mixture of thiourea and ammonium thiocyanate is heated to 150-230° C. 75 to 85 parts of this mixture are mixed with 5 to 10 parts of aniline and 3 to 8 parts of paraformaldehyde and heated 6 to 20 hours at 70-90° C. The time of heating may be ascertained by simple preliminary tests. Too long heating should be avoided, as the reaction products will otherwise become insoluble. To the thus obtained products 2 to 3% wood dust are added and intimately mixed. An extraordinarily efficient non-hygroscopic inhibitor is obtained.

Example 2

86 parts of a mixture of equal parts ammonium thiocyanate and thiourea are mixed with 3 to 5 parts of sawdust, 4 parts paraformaldehyde and 10 parts aniline and the so formed mixture heated 20 hours at 80° C. Thereby a yellow artificial resin is formed on the ammonium thiocyanate and thiourea crystals respectively. This inhibitor exerts a greater inhibiting effect than the best hitherto known picklings even in very small concentrations and in hot acid. The following comparative tests prove its superiority. The comparative tests were carried out with 20% sulphuric acid; pickling time one hour. The results may be seen from the following table:

|  | Without addition (pure acid) | "Rodine" pickling [1] | Pickling according to my invention |
|---|---|---|---|
| 1. Addition 0.03% temp. 60°: |  |  |  |
| Decrease in g./qm_____grs__ | 74.46 | 4.52 | 3.04 |
| Inhibiting effect__per cent__ | 0 | 93.9 | 95.9 |
| 2. Addition 0.02% temp. 60°: |  |  |  |
| Decrease in g./qm_____grs__ | 74.46 | 6.7 | 3.42 |
| Inhibiting effect__per cent__ | 0 | 91 | 95.41 |
| 3. Addition 0.01% temp. 60°: |  |  |  |
| Decrease in g./qm_____grs__ | 74.46 | 8.6 | 5.89 |
| Inhibiting effect__per cent__ | 0 | 88.4 | 92.1 |
| 4. Addition 0.02% temp. 80°: |  |  |  |
| Decrease in g./qm_____grs__ | 371 | 17.26 | 11.4 |
| Inhibiting effect__per cent__ | 0 | 95.35 | 96.93 |

[1] This trade-mark means substituted thioureas, particularly di-o-tolylthiourea.

Similar results are obtained with hydrochloric acid instead of sulphuric acid.

What I claim is:

1. An inhibitor for acid baths for pickling metals comprising at least one substance selected from the group consisting of ammonium thiocyanate and thiourea the crystals of which are coated superficially with a condensation product of paraformaldehyde and aniline.

2. An inhibitor for acid baths for pickling metals composed of a mixture of ammonium thiocyanate and thiourea the crystals of which are superficially coated with a condensation product of paraformaldehyde and aniline.

3. A process for the preparation of an inhibitor for acid baths for pickling metals, which comprises heating a mixture containing 75 to 85 parts of a mixture of ammonium thiocyanate and thiourea, 5 to 10 parts of aniline, 3 to 8 parts of paraformaldehyde for a period of 6 to 20 hours at 70° C. to 90° C.

FRANZ SCHELLING.